(12) United States Patent
Yan et al.

(10) Patent No.: US 10,581,730 B2
(45) Date of Patent: Mar. 3, 2020

(54) PACKET PROCESSING USING SERVICE CHAINS

(71) Applicant: VMware, Inc., Palo Alto, CA (US)

(72) Inventors: Miao Yan, Beijing (CN); Keyong Sun, Beijing (CN); Dousheng Zhao, Beijing (CN); Yonggang Wang, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/033,203

(22) Filed: Jul. 12, 2018

(65) Prior Publication Data

US 2020/0021518 A1 Jan. 16, 2020

(51) Int. Cl.
*H04L 12/721* (2013.01)
*H04L 12/931* (2013.01)
*H04L 12/715* (2013.01)
*H04L 12/861* (2013.01)
*H04L 12/24* (2006.01)
*H04L 29/06* (2006.01)
*H04L 12/46* (2006.01)
*G06F 9/455* (2018.01)
*H04L 12/26* (2006.01)

(52) U.S. Cl.
CPC .......... *H04L 45/38* (2013.01); *G06F 9/45558* (2013.01); *H04L 12/4633* (2013.01); *H04L 12/4641* (2013.01); *H04L 41/0806* (2013.01); *H04L 43/10* (2013.01); *H04L 45/64* (2013.01); *H04L 49/70* (2013.01); *H04L 49/90* (2013.01); *H04L 69/22* (2013.01); *G06F 2009/45595* (2013.01)

(58) Field of Classification Search
CPC ............. G06F 9/45533; G06F 12/0223; G06F 15/17331
See application file for complete search history.

(56) References Cited

U.S. PATENT DOCUMENTS

| 9,401,865 | B2 | 7/2016 | Morimoto | |
|---|---|---|---|---|
| 9,491,063 | B2* | 11/2016 | Kempf | .................... H04L 41/50 |
| 2003/0156559 | A1 | 8/2003 | Yi et al. | |
| 2010/0098085 | A1 | 4/2010 | Wu et al. | |
| 2014/0365680 | A1 | 12/2014 | van Bemmel | |
| 2015/0281054 | A1 | 10/2015 | Utgikar et al. | |
| 2015/0370586 | A1* | 12/2015 | Cooper | ............... G06F 9/45533 710/308 |
| 2015/0372840 | A1* | 12/2015 | Benny | ................. H04L 12/4675 370/409 |

(Continued)

*Primary Examiner* — Melanie Jagannathan
(74) *Attorney, Agent, or Firm* — SU IP Consulting

(57) ABSTRACT

Example methods are provided for a host to perform packet processing using a service chain in a software-defined networking (SDN) environment. The method may comprise establishing a datapath between a first virtualized computing instance and a second virtualized computing instance in the service chain, the datapath bypassing a forwarding element to which the first virtualized computing instance and the second virtualized computing instance are connected. The method may also comprise: the first virtualized computing instance obtaining a packet that requires processing by the service chain, and performing packet processing according to a first service. The method may further comprise: the second virtualized computing instance obtaining the processed packet via the datapath, and performing packet processing according to a second service.

15 Claims, 6 Drawing Sheets

(56) References Cited

U.S. PATENT DOCUMENTS

| | | | |
|---|---|---|---|
| 2016/0036703 A1 | 2/2016 | Josyula | |
| 2016/0226794 A1* | 8/2016 | Rao | H04L 49/10 |
| 2016/0285706 A1* | 9/2016 | Rao | H04L 43/028 |
| 2016/0308690 A1 | 10/2016 | Chanda et al. | |
| 2016/0337329 A1* | 11/2016 | Sood | H04L 63/08 |
| 2017/0054630 A1 | 2/2017 | Liang | |
| 2017/0060708 A1 | 3/2017 | Narang et al. | |
| 2017/0063672 A1 | 3/2017 | Chhabra et al. | |
| 2017/0078216 A1* | 3/2017 | Adolph | H04L 12/4641 |
| 2017/0201323 A1 | 7/2017 | Prakash et al. | |
| 2018/0176120 A1 | 6/2018 | Katz et al. | |
| 2018/0196685 A1* | 7/2018 | Dorr | G06F 9/45558 |
| 2018/0248785 A1 | 8/2018 | Dubey et al. | |
| 2018/0367387 A1* | 12/2018 | Kompella | H04L 41/0853 |
| 2019/0028577 A1 | 1/2019 | D?Souza | |
| 2019/0132221 A1* | 5/2019 | Boutros | H04L 12/4633 |

\* cited by examiner

PACKET PROCESSING USING SERVICE CHAINS

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. In practice, a service chain may be deployed to provide a range of services to other virtualized computing instances in the SDN environment. However, packet processing using such service chains may not be performed in an efficient manner according to conventional approaches.

DETAILED DESCRIPTION

Figure 1:
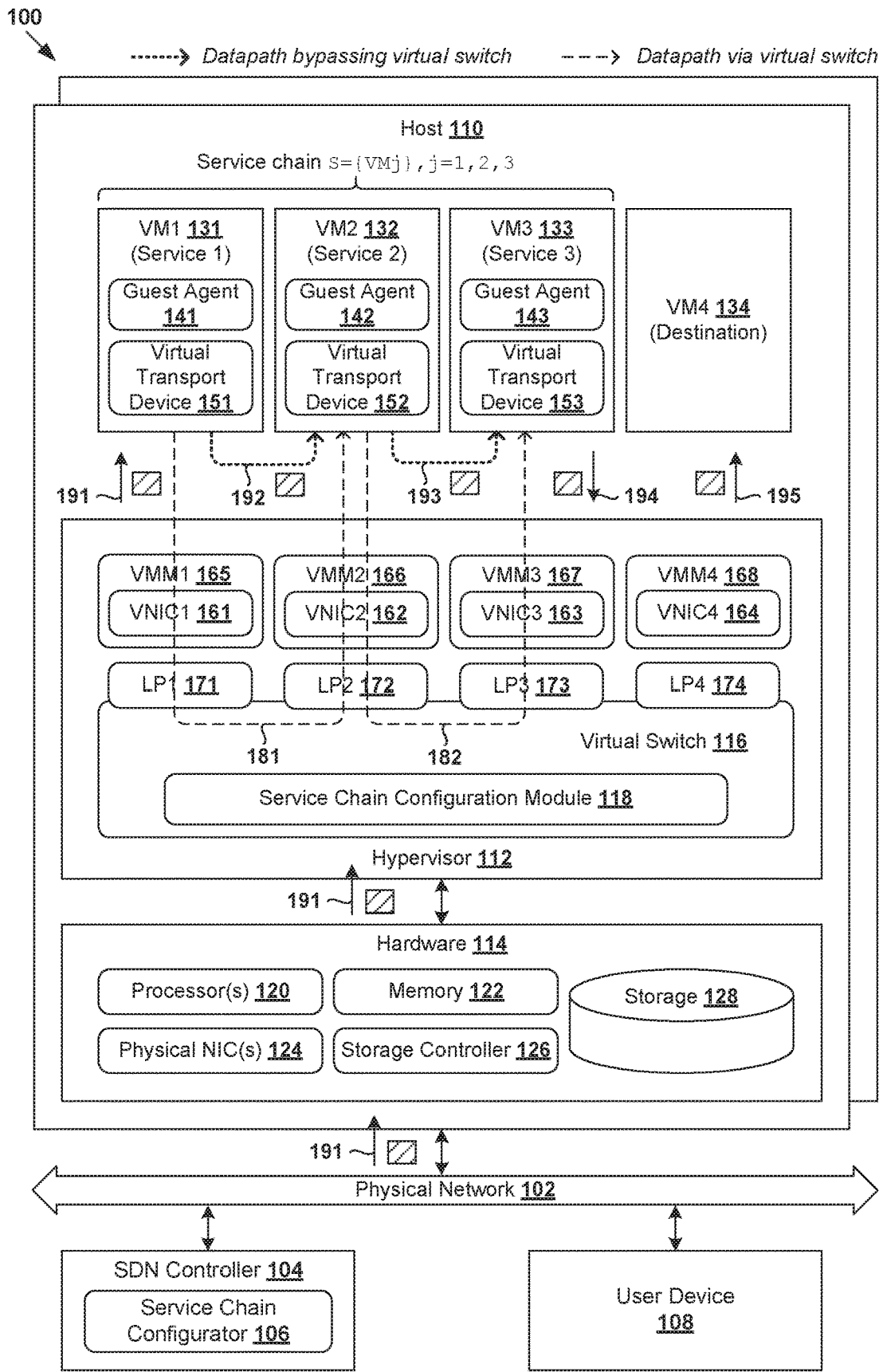
FIG. 1 is a schematic diagram illustrating an example Software-Defined Networking (SDN) environment in which packet processing using a service chain may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to implementation of service chains will now be explained in more detail using FIG. 1, which is a schematic diagram illustrating example Software-Defined Networking (SDN) environment 100 in which packet processing using a service chain may be performed. It should be understood that, depending on the desired implementation, SDN environment 100 may include additional and/or alternative components than that shown in FIG. 1.

In the example in FIG. 1, virtualized computing environment 100 includes multiple hosts 110 (one shown in detail for simplicity; also known as "computer systems", "host computers", "host devices", "physical servers", "server systems", etc.) that are connected to physical network 102. Each host 110 includes suitable virtualization software (e.g., hypervisor 112) and hardware 114 to support virtual machines (VMs), such as VM1 131, VM2 132, VM3 133 and VM4 134. Although one host 110 and four VMs 131-134 are shown for simplicity, there may be multiple hosts in virtualized computing environment 100, each supporting tens or hundreds of virtual machines in practice.

Each host 110 is connected with management entity or entities via physical network 102. In the example in FIG. 1, SDN controller 104 is an example management entity that facilitates management and configuration of various objects in SDN environment 100, such as hosts 110, VMs 131-134, etc. One example of an SDN controller is the NSX controller component of VMware NSX® (available from VMware, Inc.) that may be a member of a controller cluster (not shown) and configurable using an SDN manager (not shown for simplicity). One example of an SDN manager is the NSX manager component that provides an interface for end users to perform any suitable configuration in SDN environment 100. In practice, management entity 104 may be implemented using physical machine(s), virtual machine(s), a combination thereof, etc. Users (e.g., network administrators) operating respective user devices 108 may access the functionalities of the SDN manager and/or SDN controller via any suitable interface, such as graphical user interface, command-line interface, Application Programming Interface (API) calls. SDN controller 104 may send configuration information to host 110 via a control-plane channel established between them, such as using TCP over Secure Sockets Layer (SSL), etc.

Hypervisor 112 maintains a mapping between underlying hardware 114 of host 110 and virtual resources allocated to respective VMs 131-134. Hardware 114 includes suitable physical components, such as central processing unit(s) or processor(s) 120A; memory 122; physical network interface controllers (NICs) 124; storage controller 126; and storage disk(s) 128, etc. Virtual resources are allocated to respective VMs 131-134 to support a guest operating system (OS) and applications (not shown for simplicity). For example, corresponding to hardware 114, the virtual resources may include virtual CPU, guest physical memory (i.e., memory visible to the guest OS running in a VM), virtual disk(s), virtual network interface controller (VNIC), etc. Virtual machine monitors (VMMs) 165-168 are implemented by hypervisor 112 to emulate hardware resources for VMs 131-134. For example, VMM1 165 is configured to emulate VNIC1 161 to provide network access for VM1 131, and VMMs 166-168 to emulate respective VNICs 162-164 for VMs 132-134. In practice, VMMs 165-168 may be considered as components that are part of respective VMs 131-134, or alternatively, separated from VMs 131-134. In both cases, VMMs 165-168 each maintain the state of respective VNICs 161-164 to facilitate migration of respective VMs 131-134. In practice, one VM may be associated with multiple VNICs (each VNIC having its own network address).

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc. Hypervisor 112 may implement any suitable virtualization technology, such as VMware ESX® or ESXi™ (available from VMware, Inc.), Kernel-based Virtual Machine (KVM), etc.

Hypervisor 112 further implements virtual switch 116 to handle traffic forwarding to and from VMs 131-134. For example, VMs 131-134 may send egress (i.e., outgoing) packets and receive ingress packets (i.e., incoming) via respective VNICs 141-144 and logical ports 171-174. As used herein, the term "logical port" may refer generally to a port on a logical switch to which a virtualized computing instance is connected. A "logical switch" may refer generally to an SDN construct that is collectively implemented by multiple virtual switches, whereas a "virtual switch" may refer generally to a software switch or software implementation of a physical switch. In practice, there is usually a one-to-one mapping between a logical port on a logical switch and a virtual port on virtual switch 116. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

In practice, virtual switch 116 may form a distributed virtual switch (DVS) with other virtual switches (not shown for simplicity) in SDN environment 100. In this case, the DVS represents a collection or aggregation of different virtual switches implemented on different hosts 110. In practice, the DVS may be implemented using any suitable technology, such as vSphere® Distributed Switch™ (a trademark of VMware, Inc.), etc. The DVS, being a software abstraction, may be implemented using any suitable number of components distributed in different hardware. As used herein, the term "packets" may refer generally to a group of bits that can be transported together from a source to a destination, such as "segments," "frames," "messages," "datagrams," etc. The term "traffic" may refer generally to multiple packets. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models. Physical network 102 may be any suitable network, such as wide area network, virtual private network (VPN), etc.

In SDN environment 100, multiple VMs may be chained or grouped together to form a "service chain" that provides service(s) to other VMs. A service chain may be represented using $S=\{VM_j\}$, where $j=1,\ldots,N$ to implement a sequence of $N \geq 2$ services. In the case of N=3 in FIG. 1, three services may be provided by respective VM1 131, VM2 132 and VM3 133, which are also known as service VMs. A service chain may be identified using a service path identifier (SPI), and a particular service within the service chain using a service identifier (SI). Using the service chain in FIG. 1, a stream of ingress packets may be processed by VM1 131 according to a first service, followed by VM2 132 according to a second service, and finally VM3 133 according to a third service before the ingress packets (e.g., in a processed form) are forwarded to destination VM4 134.

Conventionally, to facilitate packet processing using a service chain, the stream of packets need to be transported in and out of virtual switch 116 multiple times as the packets are processed by service VMs 131-133. See dashed line labelled 181-182 in FIG. 1. Operations for transporting packets to enter and exit VMs 131-133 (as well as associated system calls) are relatively high cost operations. As such, in some cases, virtual switch 116 may become a bottleneck that adversely affects packet processing performance and scalability. Such problems are exacerbated when there is a large number of VMs in the service chain.

Packet Processing Using Service Chain

According to examples of the present disclosure, packet processing using a service chain may be implemented in an improved manner. Instead of relying on a forwarding element such as virtual switch 116 to dispatch packets (see 191-192 in FIG. 1) to and from VMs 131-133 forming a service chain, packets may be transported through the service chain via datapaths that are established among VMs 131-133. This way, packet transport may be performed using the datapaths, thereby bypassing virtual switch 116 to which VMs 131-133 are connected. This reduces, if not avoids, intervention by hypervisor 112 on host 110 during packet processing, as well as the risk of virtual switch 116 becoming a bottleneck. Using examples of the present disclosure, packet processing using the service chain may be performed more efficiently.

As used herein, the term "service chain" may refer generally to a chain of multiple VMs providing respective service(s). For example, a service chain may represent an instantiation of an ordered set of service functions through which traffic is steered. The term "service" may refer generally to operation(s) performed by a particular service VM, including but not limited to networking service(s) such as firewall, load balancing, network address translation (NAT), intrusion detection, deep packet inspection (DPI), traffic shaping, traffic optimization, packet header enrichment or modification, packet tagging, content filtering, etc. It should be understood that the operation(s) associated with a service may or may not modify the content (e.g., header(s) or payload) of the packets. Depending on the desired implementation, a service chain may include VM(s) that are configured to perform non-networking service(s), etc.

Figure 2:
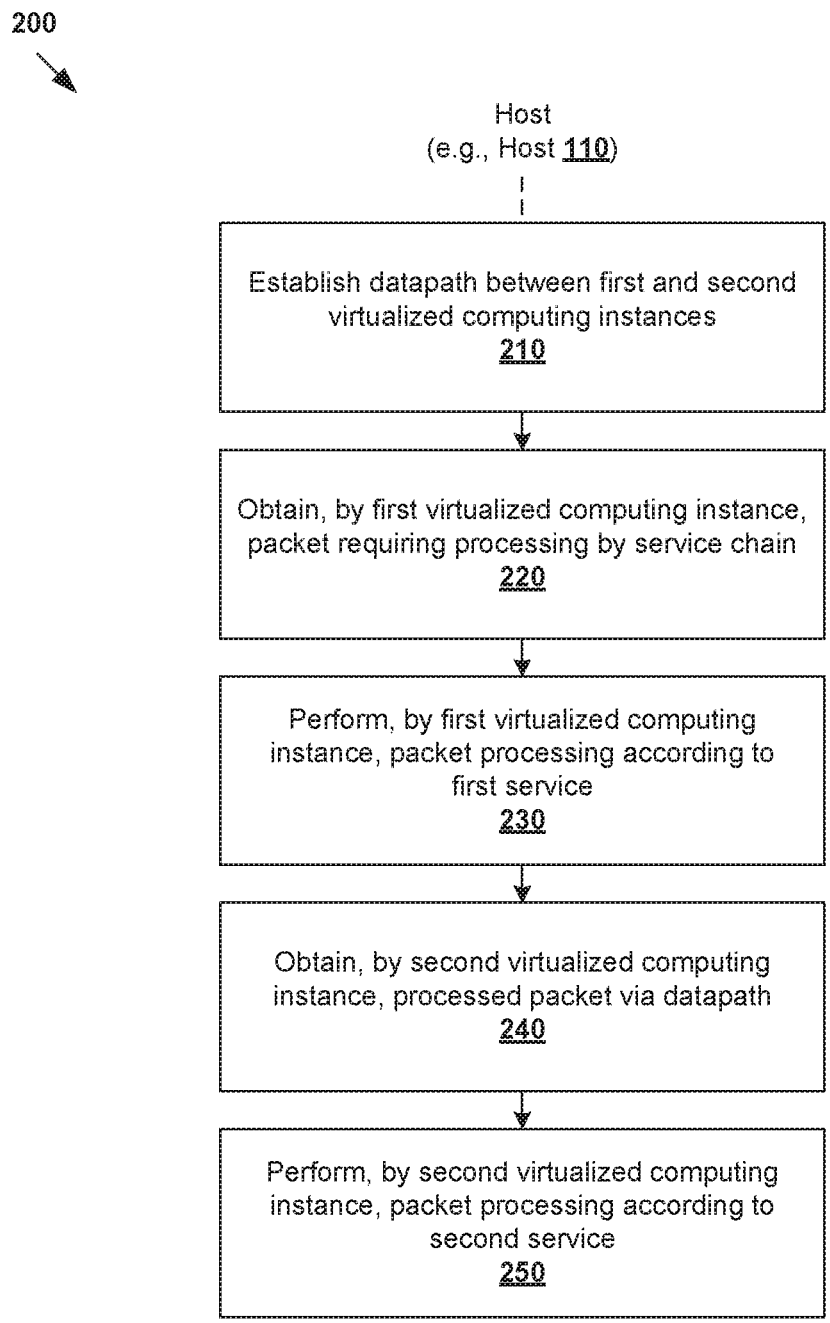
FIG. 2 is a flowchart of an example process for a host to perform packet processing using a service chain in an SDN environment.

In more detail, FIG. 2 is a flowchart of example process 200 for a host to perform packet processing using a service chain in an SDN environment. Example process 200 may include one or more operations, functions, or actions illustrated by one or more blocks, such as 210 to 250. The various blocks may be combined into fewer blocks, divided into additional blocks, and/or eliminated depending on the desired implementation. In the following, various examples of the present disclosure will be explained using VMs 131-133 supported by host 110 as example "virtualized computing instances" forming a service chain, and virtual switch 116 as an example "forwarding element" to which VMs 131-133 are connected.

At 210 in FIG. 2, a first datapath may be established between VM1 131 ("first virtualized computing instance") and VM2 132 ("second virtualized computing instance"). The datapath may bypass virtual switch 116 to which VM1 131 and VM2 132 are connected. At 220 and 230 in FIG. 2, VM1 131 may obtain a packet (see 191 in FIG. 1) that requires processing by the service chain, and perform packet processing according to a first service based on the packet. At 240 and 250 in FIG. 2, VM2 132 may obtain the processed packet (see 192 in FIG. 1) via the datapath established with VM1 131, and perform packet processing according to a second service based on the processed packet prior to subsequent forwarding to a destination node (e.g., VM4 134). This way, VM1 131 may exchange data with VM2 132 directly via the first datapath.

In the example in FIG. 1, the service chain further includes VM3 133 ("third virtualized computing instance"). In this case, according to 210 in FIG. 2, a second datapath may be established between VM2 132 and VM3 133. Similarly, the second datapath also bypasses virtual switch 116 to which VM2 132 and VM3 133 are connected. VM3 133 may obtain a packet (see 193 in FIG. 1) processed by VM2 132 via the second datapath, and perform packet processing according to a third service prior to subsequent forwarding to destination VM4 134. See corresponding 194-195 in FIG. 1. This way, VM2 132 may exchange data with VM3 133 directly via the second datapath.

As will be discussed further using FIG. 3 and FIG. 4, block 210 in FIG. 2 may include establishing the first datapath between a first virtual component (e.g., first virtual transport device 151) implemented by VM1 131 and a second virtual component (e.g., second virtual transport device 152) implemented by VM2 132. Here, the term "virtual component" may refer generally to any suitable software-implemented component of VM 131/132/133. For example, the first datapath may be established by mapping a transmit (TX) queue of first virtual transport device 151 to a receive (RX) queue of second virtual transport device 152. In this case, block 230 may involve VM1 131 writing the processed packet to the TX queue, and block 240 may involve VM2 132 polling the TX queue to obtain the processed packet. Example queue mapping will be discussed below using FIGS. 3-6.

Service Chain Configuration

Figure 3:
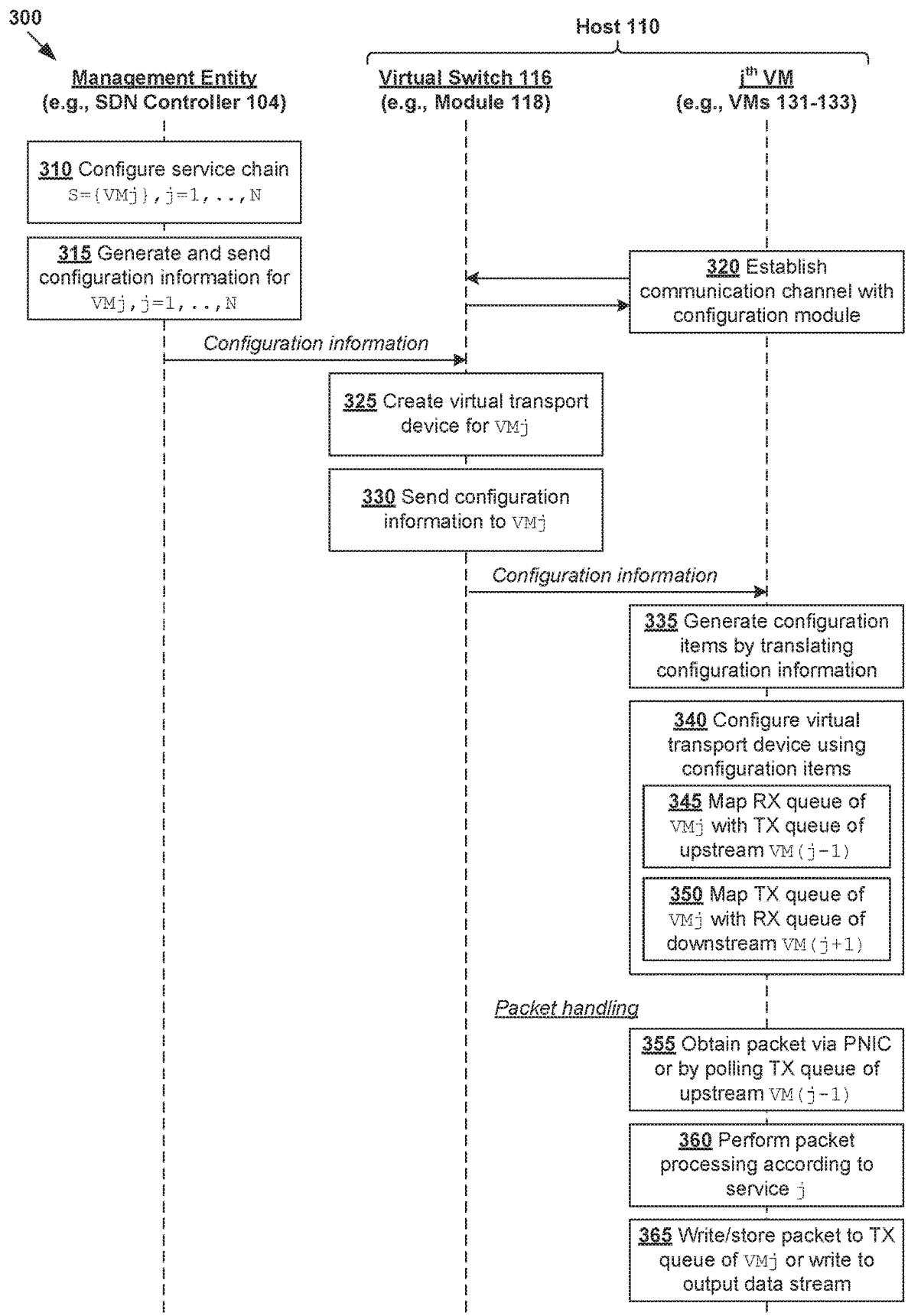
FIG. 3 is a flowchart of an example detailed process for configuring and performing packet processing using a service chain in an SDN environment.

FIG. 3 is a flowchart of example detailed process 300 of packet processing using a service chain in SDN environment 100. Example process 300 may include one or more operations, functions, or actions illustrated by one or more blocks, such as 310 to 365. The various blocks may be combined into fewer blocks, divided into additional blocks, and/or eliminated depending on the desired implementation. In practice, examples of the present disclosure may be implemented by SDN controller 104 (e.g., using service chain configurator 106), host 110 (e.g., using service chain configuration module 118), VMs 131-133 (e.g., using respective guest agents 141-143 in a user space and virtual transport devices 151-153 in a kernel space), etc. Some examples will be explained using FIG. 4, which is a schematic diagram illustrating example service chain configuration 400 in SDN environment 100 according to the example in FIG. 3.

At 310 in FIG. 3, SDN controller 104 (e.g., service chain configurator 106) configures a service chain that includes multiple VMs. As explained using FIG. 1, a service chain S may be represented using S={$VM_j$}, where j=1, N and N≥2.

Figure 4:
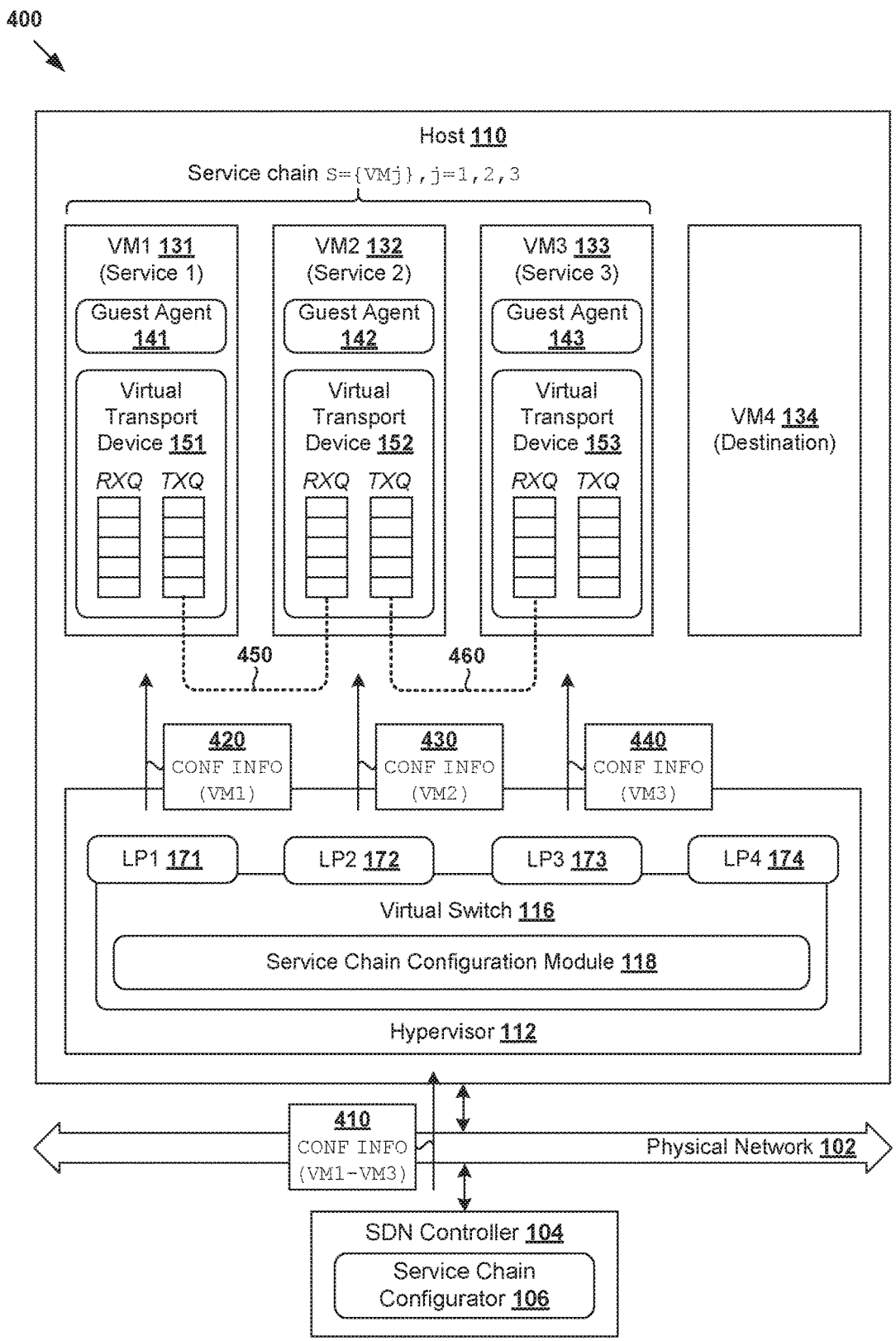
FIG. 4 is a schematic diagram illustrating an example service chain configuration in an SDN environment according to the example in FIG. 3.

In the example of N=3 in FIG. 4, a service chain formed by VM1 131, VM2 132 and VM3 133 may be represented using S={VM1, VM2, VM3}. The data flow from one VM to another may be configured based on user workloads and specifications.

From the perspective of VM1 131, VM2 132 is a downstream VM. From the perspective of VM2 132, VM1 131 is an upstream VM while VM3 133 a downstream VM. From the perspective of VM3 133, VM2 132 is an upstream VM. The first VM (e.g., VM1 131) in the service chain may be known as a data source that obtains packets from physical NIC 124, or another VM (not shown) on host 110, via virtual switch 116. The last VM (e.g., VM3 133) may use any suitable approach to output the packets after processing by the service chain.

At 315 in FIG. 3, for each $j^{th}$ VM in the service chain, SDN controller 104 generates and sends configuration information to host 110 to configure the service chain. Depending on the desired implementation, the configuration information may include forwarding rule(s) to detect certain network packets, etc. An example forwarding rule may be in the form of (MAC address=MAC-VM1, VLAN ID=10, source=IP-VM5, destination=IP-VM4) to capture network packets destined for VM4 134 supported by host 110.

Meanwhile, at 320 in FIG. 3, VMs 131-133 forming the service chain may each establish a communication channel with virtual switch 116 to receive configuration information from virtual switch 116 (to be discussed further below). In the example in FIG. 4, first guest agent 141 of VM1 131 may establish a first communication channel with virtual switch 116. Similarly, second guest agent 142 of VM2 132 and third guest agent 143 of VM3 133 may establish respective communication channels with virtual switch 116. Using a DVS implementation, guest agents 141-143 may represent respective guest DVS components that communicate with a host DVS component at virtual switch 116. The "communication channel" may be established using any suitable approach, such as using an input/output (I/O) mechanism (e.g., hypercall) provided by hypervisor 112, a shared memory space for messaging between in-guest daemons or agents and component(s) of hypervisor 112, a covert network channel via which configuration information destined for VM 131/132/133 may be directed to its guest agent 141/142/143, etc.

At 325 and 330 in FIG. 3, in response to receiving configuration information from SDN controller 104, host 110 (e.g., using service chain configuration module 118) configures a virtual transport device for each $j^{th}$ VM in the service chain, and sends configuration information (e.g., forwarding rule(s)) to the VM accordingly. In the example in FIG. 4, in response to receiving configuration information (see 410), host 110 configures first virtual transport device 151 for VM1 131, second virtual transport device 152 for VM2 132 and third virtual transport device for VM3 133. Based on configuration information 410 from SDN controller 104, configuration information 420/430/440 is also sent to each VM 131/132/133 forming the service chain. Depending on the desired implementation, service chain configuration module 118 may generate configuration information 420/430/440 that identifies the relevant queue mapping steps (to be explained further below) based on configuration information 410 from SDN controller 104. Configuration information 420/430/440 is sent to each VM 131/132/133 via guest agent 141/142/143.

As used herein, the term "virtual transport device" may refer generally to a virtual component of a particular VM via which packets are transported or forwarded in and out of the VM. Any suitable approach may be used to implement the virtual transport device. For example, once installed, the backend of the virtual transport device may be implemented in the host's kernel and exposed to the VM's guest OS as a (virtual) Peripheral Component Interconnect (PCI) device through a PCI network interface. In this case, the configuration at block 325 may include generating and sending a plug-in message or event to create and plug in virtual transport device 151/152/153 to VM 131/132/133.

At 335 in FIG. 3, in response to obtaining configuration information 420/430/440 via a communication channel established at block 320, guest agent 141/142/143 of VM 131/132/133 generates configuration items readable by virtual transport device 151/152/153. For example, guest agent 141/142/143 may translate configuration information 420/430/440 into appropriate configuration items using any suitable approach, such as by querying a datastore or knowledge base accessible by host 110, etc. In the example in FIG. 4, first guest agent 141 of VM1 131 may generate first configuration items to configure first virtual transport device 151. Second guest agent 142 of VM2 132 may generate second configuration items to configure second virtual transport device 152. Third guest agent 143 of VM3 133 may generate third configuration items to configure third virtual transport device 153.

At 340 in FIG. 3, guest agent 141/142/143 configures virtual transport device 151/152/153 using the configuration items. For example, the configuration items may include device-readable representation of forwarding rule(s) configured by SDN controller 104. Each configuration item may specify operation(s) or action(s) to be performed by virtual transport device 151/152/153. For example, upon system initialization, virtual transport device 151/152/153 may expose an interface to guest agent 141/142/143. After the translation at block 335, guest agent 141/142/143 may write data (e.g., configuration items) to the exposed interface. In response to reading the configuration items via the exposed interface, virtual transport device 151/152/153 may proceed to execute the configuration items. Once the configuration is completed, virtual transport device 151/152/153 may be used during packet processing.

Virtual transport device 151/152/153 may configure itself based on the configuration items translated by guest agent 141/142/143. Example configuration items include stopping virtual transport device 151/152/153, allocating resources, applying a particular packet filter (e.g., based on MAC address=MAC-VM5 and VLAN ID=10), performing queue mapping (to be discussed below), restarting virtual transport device 151/152/153 after the configuration is completed, etc. For example, at 345 and 350 in FIG. 3, a datapath may be established between a pair of VMs by mapping a receive (RX) queue of a particular $j^{th}$ VM to a transmit (TX) queue of an upstream $(j-1)^{th}$ VM and/or mapping a TX queue of the particular $j^{th}$ VM to an RX queue of a downstream $(j+1)^{th}$ VM. Using the PCI device example above, an upstream VM may appear as a (virtual) network card to its downstream VM, and vice versa.

In the example in FIG. 4, a first direct datapath (see 450; shown in dotted line) is established between VM1 131 and VM2 132 by mapping the TX queue of VM1 131 with the RX queue of its downstream VM2 132. Once mapped, downstream VM2 132 may poll a data descriptor associated with the TX queue of upstream VM1 131 for data availability and read data from the mapped TX queue. Similarly, a second direct datapath (see 460; shown in dotted line) is established between VM2 132 and VM3 133 by mapping the TX queue of VM2 132 with the RX queue of its downstream VM3 133. Once mapped, downstream VM3 133 may poll a data descriptor associated with the TX queue of upstream VM2 132 for packet availability, and read packet(s) from the mapped TX queue. In practice, any additional and/or alternative approach may be used by a downstream VM to obtain data or packet(s) from an upstream VM. For example, using a push approach, an upstream VM may push data or packet(s) to the TX queue of its downstream VM. The establishment of datapaths 450-460 may rely on the order according to which services are implemented by the service chain.

Packet Processing Using Service Chain

According to examples of the present disclosure, datapaths 450-460 allow packets to be transported through a service chain without entering virtual switch 116. In the example in FIG. 4, datapaths 450-460 may be optimized based on known or fixed forwarding information, i.e., VM1 131 knows its destination is VM2 132 and VM2 132 knows its destination is VM3 133 within the service chain. This way, any potential bottleneck issue at virtual switch 116 may be minimized, if not avoided, and intervention by hypervisor 112 reduced during packet processing. Examples of the present disclosure should be contrasted against conventional approaches that transport packets in and out of virtual switch 116 during packet processing by a service chain. Some examples will be explained below using blocks 355-365 in FIG. 3 and FIG. 5.

Figure 5:
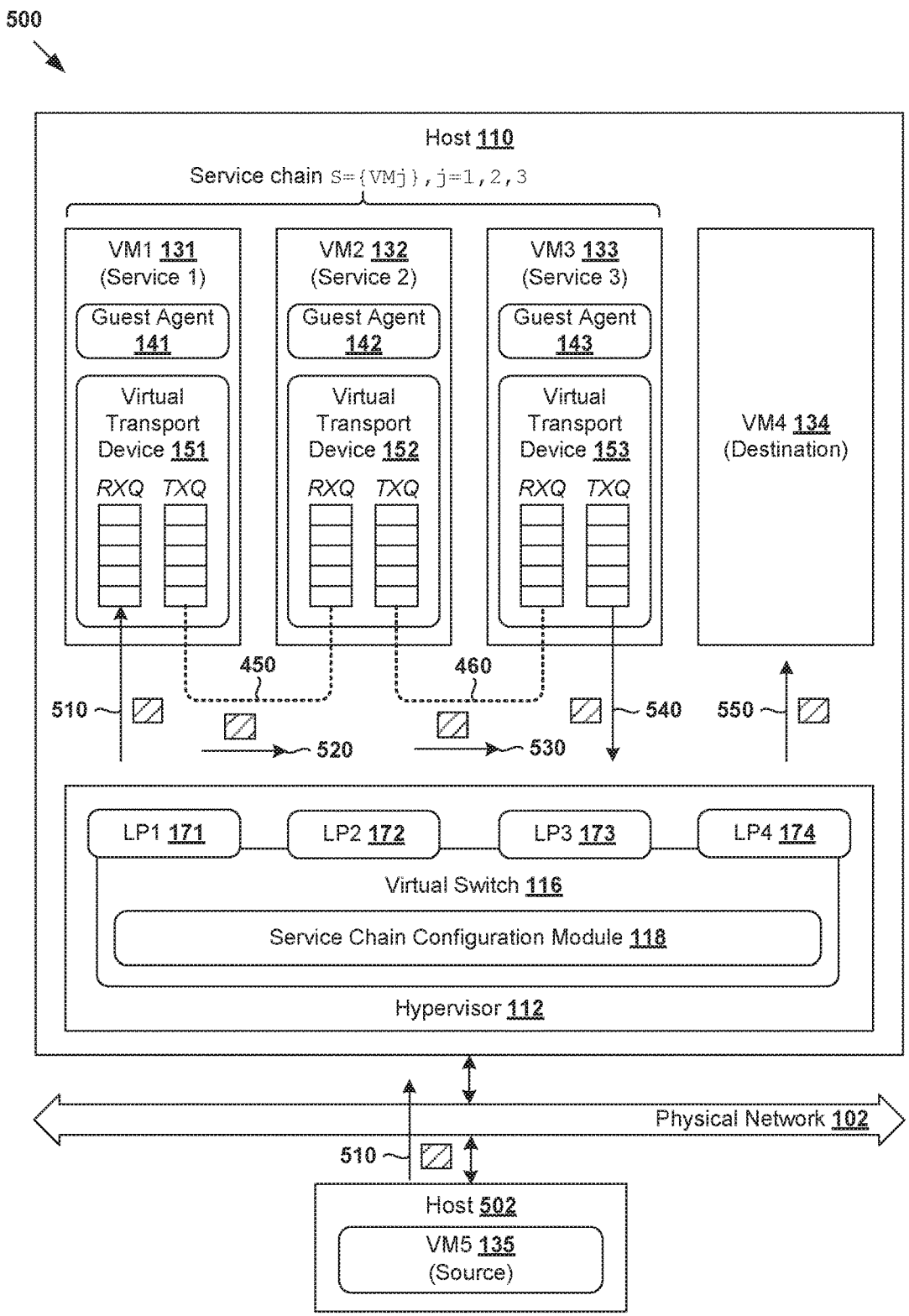
FIG. 5 is a schematic diagram illustrating an example packet processing using a service chain in an SDN environment according to the example in FIG. 3.

In more detail, FIG. 5 is a schematic diagram illustrating an example packet processing using a service chain in an SDN environment according to the example in FIG. 3. Here, consider a scenario where source VM5 135 on host 502 sends a stream of packets to destination VM4 134 on host 110. In this case, the packets may include packet header information that specify source address information (IP-VM5, MAC-VM5) associated with VM5 135, destination address information (IP-VM4, MAC-VM4) associated with VM4 134, logical overlay network information (VLAN ID=10), etc. See corresponding packet 510 in FIG. 5.

Although not shown in FIG. 5 for simplicity, packet 510 may include outer header information, inner header information and payload information. For example, source host 502 and destination host 110 may each implement a virtual tunnel endpoint (VTEP) to encapsulate and decapsulate packets with an outer header (also known as a tunnel header) identifying the relevant logical overlay network on which VM5 135 and VM4 134 are located. For example in FIG. 5, source host 502 may implement a first VTEP associated with (IP address=IP-A, MAC address=MAC-A, VTEP label=VTEP-A), and destination host 110 a second VTEP with (IP-B, MAC-B, VTEP-B). This way, encapsulated packets may be sent via an end-to-end, bi-directional communication path (known as a tunnel) between a pair of VTEPs over physical network 102.

A logical overlay network (also known as "logical network") may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. In the example in FIG. 1, source VM5 135 on host 502 and destination VM4 134 on host 110 may be located on the same logical layer-2 segment, such as VXLAN segment with VXLAN network identifier (VNI)=6000. In this case, the outer header information of packet 510 may specify the VTEP address information and logical overlay network information.

Prior to delivery to destination VM4 134, ingress packet 510 is processed by the service chain formed by VM1 131, VM2 132 and VM3 133. In particular, packet 510 may be processed by VM1 131, followed by VM2 132 and VM3 133 before being forwarded to VM4 134. First, referring to 355 and 360 in FIG. 3, VM1 131 (being the first VM in the service chain) obtains packet 510 via physical NIC 124 of host 110 and performs packet processing according to a first service provided by VM1 131. At 365 in FIG. 3, after processing packet 510, VM1 131 writes the packet to its TX queue of virtual transport device 151.

Next, VM2 132 (being the second VM in the service chain) obtains packet 520 from VM1 131 via first datapath 450 configured between them. For example, this may involve VM2 132 polling the TX queue of upstream VM1 131 to detect whether packet 520 is available. If yes, VM2 132 obtains packet 520 from the TX queue of VM1 131 via first datapath 450, thereby bypassing virtual switch 116. As explained using FIG. 4, virtual transport device 151 of upstream VM1 131 may present itself as a network card to virtual transport device 152 of downstream VM2 132. At 365 in FIG. 3, after processing packet 520, VM2 132 writes the packet to the TX queue of virtual transport device 152.

Further, VM3 133 obtains packet 530 (i.e., a processed form of packet 520) from VM2 132 via second datapath 460 configured between VM2 132 and VM3 133. For example, this may involve VM3 133 polling the TX queue of upstream VM2 132 to determine whether packet 530 is available. If yes, VM3 133 obtains packet 530 from the TX queue of VM2 132 via first datapath 450, thereby bypassing virtual switch 116. Similarly, virtual transport device 152 of upstream VM2 132 may present itself as a network card to virtual transport device 153 of downstream VM3 133. At 365 in FIG. 3, after processing packet 530, VM3 133 (being the final VM in the service chain) writes the packet to an output stream for forwarding to destination VM4 134.

As shown in FIG. 5, VM3 133 forwards packet 540 (i.e., a processed form of packet 530) to virtual switch 116, which then delivers the packet to VM4 134 (see 550). It should be noted that VM 131/132/133 may or may not modify the content of packet 510/520/530 during packet processing at block 360 in FIG. 3. Reference numerals 510-550 are used in FIG. 5 to indicate progress of packet processing through a service chain. For example, packet 520/530/540/550 represents a processed form of (i.e., may or may not be the same as) packet 510 received from source host 502.

Dynamic Reconfiguration

According to examples of the present disclosure, it should be understood that a service chain may be reconfigured dynamically to add additional and/or alternative service VMs and/or to remove any existing service VMs. In this case, the datapaths between any pair of VMs may be dynamically added, removed or modified. Some examples are shown in FIG. 6, which is a schematic diagram illustrating an example service chain reconfiguration in an SDN environment according to the example in FIG. 3.

Figure 6:
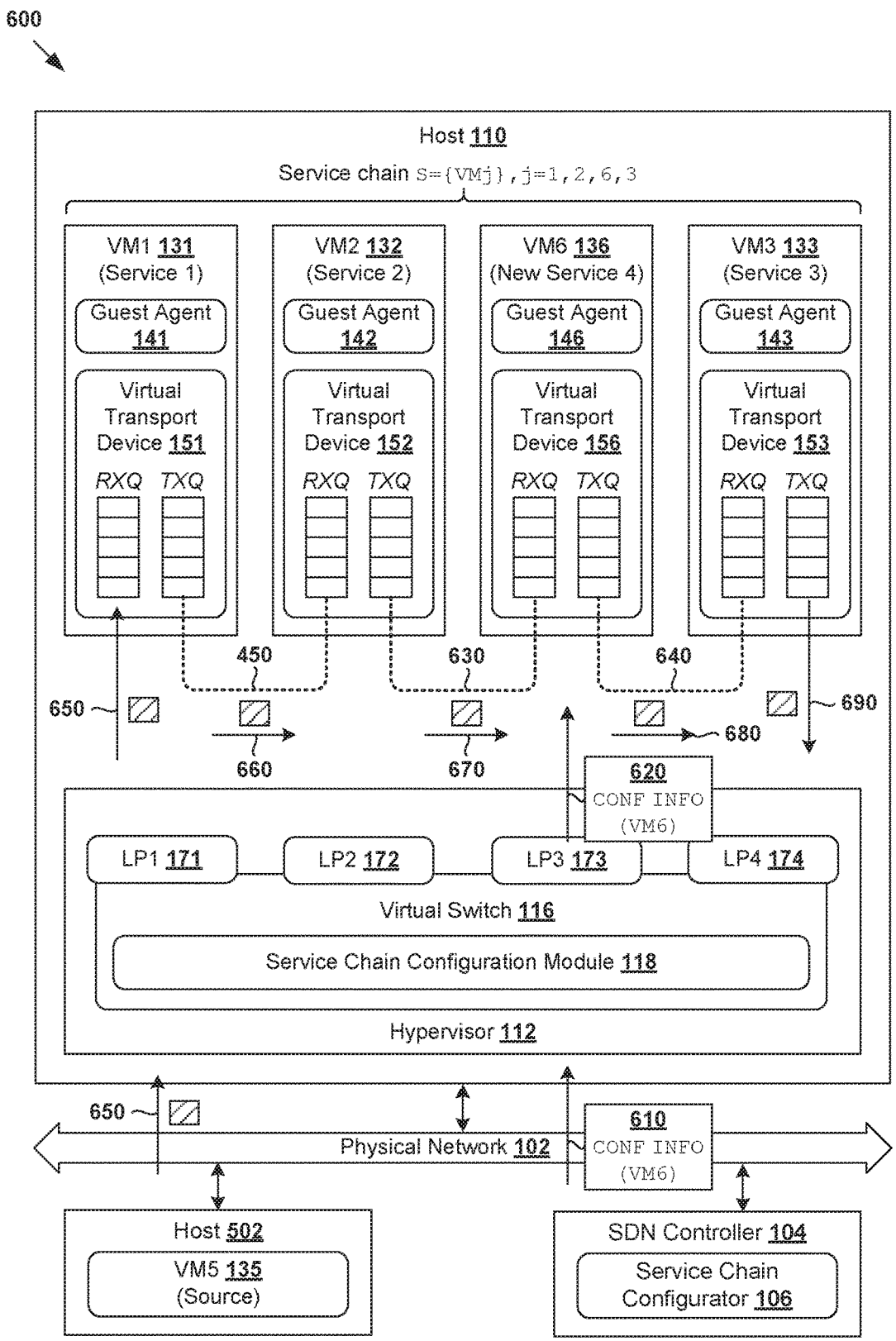
FIG. 6 is a schematic diagram illustrating an example service chain reconfiguration in an SDN environment according to the example in FIG. 3.

In the example in FIG. 6, a new service implemented by VM6 136 may be added to the service chain in FIG. 4 and FIG. 5, such as between VM2 132 and VM3 133. According to blocks 325 to 350 in FIG. 3, in response to receiving configuration information (see 610 in FIG. 6) from SDN controller 104, host 110 configures virtual transport device 156 using guest agent 146 implemented by VM6 136 and sends appropriate configuration information (see 620) to VM6 136.

In response to receiving configuration information 620 from virtual switch 116, guest agent 146 of VM6 136 may translate configuration information 620 to configuration items readable by virtual transport device 156. The configuration may involve mapping an RX queue of VM6 136 to a TX queue of upstream VM2 132 to form datapath 630 between VM2 132 and VM6 136. Further, the configuration may involve mapping a TX queue of VM6 136 to an RX queue of downstream VM3 133 to form datapath 640 between VM6 136 and VM3 133.

During packet processing, packets will be processed according to blocks 355 to 365 in FIG. 3. In particular, in response to receiving ingress packet 650 destined for VM4 134 (not shown in FIG. 6 for simplicity), the packet will be processed by the service chain formed by VM1 131, VM2 132, VM6 136 and VM3 133. As shown in FIG. 6, once processed by VM1 131, downstream VM2 132 may obtain the packet (see 660) from the TX queue of VM1 131 via first datapath 450. Once processed by VM2 132, downstream VM6 136 may obtain the packet (see 670) from the TX queue of VM2 132 via second datapath 630. Once processed by VM6 136, downstream VM3 133 may obtain the packet (see 680) from the TX queue of VM6 136 via third datapath 640. Once processed by VM3 133 (i.e., final VM in the service chain), the packet (see 680) may be forwarded to virtual switch 116 for subsequent forwarding to its destination VM4 134. Note that VM4 134 may be on the same host 110 as the service chain, or on a different host.

It should be understood that the service chain in FIG. 6 may be reconfigured by modifying the mapping between the virtual transport devices. For example, the set of VMs may be rearranged or reordered dynamically from {VM1, VM2, VM6, VM3} in FIG. 6 to {VM1, VM3, VM2, VM6}. In this case, the TX queue of VM1 131 may be mapped to the RX queue of downstream VM3 133, whose TX queue is mapped to the RX queue of downstream VM2 132, whose TX queue is mapped to the RX queue of downstream VM6 136.

A service provided by a particular VM may also be removed from the service chain. For example, virtual transport device 152 may be deleted when VM2 132 is removed from the service chain, such as by a user (e.g., network administrator) via a management entity. In this case, in response to receiving configuration information from SDN controller 104, host 110 may generate and send an unplug message (e.g., PCI unplug message) to VM2 132 to cause VM2 132 to perform necessary cleanup operation(s), remove any mapping with other virtual transport device(s) and destroy virtual transport device 152 at VM2 132.

Container Implementation

Although explained using VMs 131-136, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 6, container technologies may be used to run various containers inside respective VMs 131-136. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6. For example, a computer system capable of acting as host 110 or SDN controller 104 may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a host to perform packet processing using a service chain in a software-defined networking (SDN) environment, wherein the service chain includes multiple virtualized computing instances supported by the host, the method comprising:

establishing a datapath between a first virtualized computing instance and a second virtualized computing instance in the service chain,
wherein the datapath bypasses a forwarding element to which the first virtualized computing instance and the second virtualized computing instance are connected,
wherein establishing the datapath comprises establishing the datapath between a first virtual component implemented by the first virtualized computing instance and a second virtual component implemented by the second virtualized computing instance, and
wherein establishing the datapath comprises, in response to receiving configuration information from a manager, configuring the first virtualized computing instance to implement the first virtual component, and the second virtualized computing instance to implement the second virtual component;

obtaining, by the first virtualized computing instance, a packet that requires processing by the service chain;
performing, by the first virtualized computing instance, packet processing on the packet according to a first service;
obtaining, by the second virtualized computing instance, the processed packet via the datapath established with the first virtualized computing instance; and
performing, by the second virtualized computing instance, packet processing on the obtained processed packet according to a second service.

2. The method of claim 1, wherein establishing the datapath comprises:
establishing the datapath by mapping a transmit (TX) queue of the first virtual component to a receive (RX) queue of the second virtual component.

3. The method of claim 2, wherein the first virtualized computing instance performing packet processing comprises:
writing, by the first virtualized computing instance, the processed packet to the TX queue of the first virtual component.

4. The method of claim 2, wherein the second virtualized computing instance obtaining the processed packet comprises:
polling, by the second virtualized computing instance, the TX queue of the first virtual component to obtain the processed packet from the first virtualized computing instance.

5. The method of claim 1, wherein establishing the datapath comprises:
generating, by a first guest agent implemented by the first virtualized computing instance, first configuration items to configure the first virtual component; and
generating, by a second guest agent implemented by the second virtualized computing instance, second configuration items to configure the second virtual component.

6. A non-transitory computer-readable storage medium that includes a set of instructions which, in response to execution by a processor of a host, cause the processor to perform a method of packet processing using a service chain in a software-defined networking (SDN) environment, wherein the service chain includes multiple virtualized computing instances supported by the host, and wherein the method comprises:
    establishing a datapath between a first virtualized computing instance and a second virtualized computing instance in the service chain,
        wherein the datapath bypasses a forwarding element to which the first virtualized computing instance and the second virtualized computing instance are connected,
        wherein establishing the datapath comprises establishing the datapath between a first virtual component implemented by the first virtualized computing instance and a second virtual component implemented by the second virtualized computing instance, and
        wherein establishing the datapath comprises, in response to receiving configuration information from a manager, configuring the first virtualized computing instance to implement the first virtual component, and the second virtualized computing instance to implement the second virtual component;
    obtaining, by the first virtualized computing instance, a packet that requires processing by the service chain;
    performing, by the first virtualized computing instance, packet processing on the packet according to a first service;
    obtaining, by the second virtualized computing instance, the processed packet via the datapath established with the first virtualized computing instance; and
    performing, by the second virtualized computing instance, packet processing on the obtained processed packet according to a second service.

7. The non-transitory computer-readable storage medium of claim 6, wherein establishing the datapath comprises:
    establishing the datapath by mapping a transmit (TX) queue of the first virtual component to a receive (RX) queue of the second virtual component.

8. The non-transitory computer-readable storage medium of claim 7, wherein the first virtualized computing instance performing packet processing comprises:
    writing, by the first virtualized computing instance, the processed packet to the TX queue of the first virtual component.

9. The non-transitory computer-readable storage medium of claim 7, wherein the second virtualized computing instance obtaining the processed packet comprises:
    polling, by the second virtualized computing instance, the TX queue of the first virtual component to obtain the processed packet from the first virtualized computing instance.

10. The non-transitory computer-readable storage medium of claim 6, wherein establishing the datapath comprises:
    generating, by a first guest agent implemented by the first virtualized computing instance, first configuration items to configure the first virtual component; and
    generating, by a second guest agent implemented by the second virtualized computing instance, second configuration items to configure the second virtual component.

11. A host configured to perform packet processing using a service chain in a software-defined networking (SDN) environment, the host comprising:
    a processor; and
    a non-transitory computer-readable medium having stored thereon instructions that, in response to execution by the processor, cause the processor to:
        establish a datapath between a first virtualized computing instance and a second virtualized computing instance in the service chain,
            wherein the datapath bypasses a forwarding element to which the first virtualized computing instance and the second virtualized computing instance are connected,
            wherein the datapath is established between a first virtual component implemented by the first virtualized computing instance and a second virtual component implemented by the second virtualized computing instance, and
            wherein establishment of the datapath comprises, in response to receipt of configuration information from a manager, configuration of the first virtualized computing instance to implement the first virtual component, and the second virtualized computing instance to implement the second virtual component;
        obtain, by the first virtualized computing instance, a packet that requires processing by the service chain;
        perform, by the first virtualized computing instance, packet processing on the packet according to a first service;
        obtain, by the second virtualized computing instance, the processed packet via the datapath established with the first virtualized computing instance; and
        perform, by the second virtualized computing instance, packet processing on the obtained processed packet according to a second service.

12. The host of claim 11, wherein the instructions to cause the processor to establish the datapath cause the processor to:
    establish the datapath by mapping a transmit (TX) queue of the first virtual component to a receive (RX) queue of the second virtual component.

13. The host of claim 12, wherein the instructions for the first virtualized computing instance to the perform packet processing cause the processor to:
    write, by the first virtualized computing instance, the processed packet to the TX queue of the first virtual component.

14. The host of claim 12, wherein the instructions for the second virtualized computing instance to obtain the processed packet cause the processor to:
    poll, by the second virtualized computing instance, the TX queue of the first virtual component to obtain the processed packet from the first virtualized computing instance.

15. The host of claim 11, wherein the instructions to cause the processor to establish the datapath cause the processor to:
    generate, by a first guest agent implemented by the first virtualized computing instance, first configuration items to configure the first virtual component; and
    generate, by a second guest agent implemented by the second virtualized computing instance, second configuration items to configure the second virtual component.

* * * * *